United States Patent
Patino et al.

(10) Patent No.: US 6,972,542 B2
(45) Date of Patent: Dec. 6, 2005

(54) SYSTEM AND METHOD FOR BATTERY VERIFICATION

(75) Inventors: Joseph Patino, Pembroke Pines, FL (US); Andrew F. Burton, Coral Springs, FL (US); Randall S. Fraser, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 49 days.

(21) Appl. No.: 10/638,621

(22) Filed: Aug. 11, 2003

(65) Prior Publication Data

US 2005/0035738 A1    Feb. 17, 2005

(51) Int. Cl.[7] ............................................... H02J 7/00
(52) U.S. Cl. ..................................... 320/106; 320/110
(58) Field of Search ................ 320/106, 110, DIG. 12, 320/128, 137; 235/382, 382.5; 340/636.1; 455/573; 713/300

(56) References Cited

U.S. PATENT DOCUMENTS 5,717,306 A  *  2/1998  Shipp .......................... 307/125
5,717,307 A        2/1998  Barkat et al.
5,939,856 A        8/1999  Demuro et al.
6,291,966 B1 *  9/2001  Wendelrup et al. ......... 320/106

OTHER PUBLICATIONS

"Motorola Announces Availability of New Wireless Phone Batteries for Increased Performance and Safety, Featuring New Hologram Design; Each Battery with Hologram Image Clearly Identifies Item as a Motorola Original™ Accessory—Not a Counterfeit or Imitation Battery", Libertyville, Ill, Jul. 23, 1998.

* cited by examiner

*Primary Examiner*—Michael Sherry
*Assistant Examiner*—Robert Grant

(57) ABSTRACT

A system for verification of a battery (100) includes the battery (100) and a device (400,500). The battery (100) includes a memory device (135) for storing an identification number and a verification number. The verification number is generated by applying a key to the identification number. The device (400,500) is coupled to the battery (100) and includes a device memory (515) for storing the key and a microprocessor (435,510) for verifying the identification number of the battery (100) by applying the key to the verification number.

18 Claims, 3 Drawing Sheets

SYSTEM AND METHOD FOR BATTERY VERIFICATION

FIELD OF THE INVENTION

The present invention generally relates to the field of battery operated electronic devices, and more particularly relates to battery operated electronic devices with battery verification.

BACKGROUND OF THE INVENTION

In the past few years, the popularity and prevalence of battery powered portable electronic devices has increased. It is not unusual for a consumer to own and utilize a multitude of such devices including cellular telephones, Personal Digital Assistants (PDA's), handheld computers, media drives, digital cameras, portable audio and video players, electronic games, and the like. Along with the pervasiveness of such devices has come a need for compatible replacement batteries.

While it is often a costly and cumbersome process for device users to find specified, internal replacement batteries, an array of replacement products are available that claim to provide many times the normal power of the original equipment manufacturer (OEM) portable products. These replacement batteries, however, can pose a safety concern because they have not necessarily been verified to pass the safety requirements imposed by the original equipment manufacturer. Further using invalid or counterfeit batteries may diminish the performance of the electronic devices because such batteries may not incorporate the appropriate hardware, software and/or memory information to ensure safe and proper charging and operation.

In an effort to protect consumers from potentially poor battery performance and possible safety hazards when charging their batteries, some manufacturers mark their OEM batteries such as with a holographic image directly on the battery. These markings help consumers distinguish OEM batteries from those that may be counterfeit or imitations.

Additionally, some manufacturers are including a programmed EPROM (electrically erasable programmable read-only memory) within the battery. The charging system in the electronic device communicates with the battery to help ensure that the proper battery charging rate and charge voltage is safely delivered. This system is designed to allow improved charge time, extend battery life and most importantly, to help ensure consumer safety.

Some electronic devices include authentication software that reads the proprietary charging information from the programmed EPROM and authenticates the battery. For example, each battery can contain an EPROM that has an EPROM ID (identification) number associated to it that is programmed by the EPROM manufacturer. Only authentic batteries (with an authentic EPROM ID) will charge properly on the devices. In some instances, counterfeit batteries can be used to power the electronic device. However, without the unique verification information, these counterfeit batteries cannot be charged properly with the device. Counterfeiters, unfortunately, have been able to duplicate the EPROM ID numbers of authentic batteries to intentionally and illegally circumvent these safety measures. Manufacturers can search for known bad EPROM ID numbers and disable charging to assure that no safety events occur. However, a concern remains that unauthorized battery vendors (counterfeiters) will merely continue to select the EPROM ID numbers of authentic batteries, so blocking via a bad EPROM ID lookup table will not be successful in the long run.

Therefore a need exists to overcome the problems with the prior art as discussed above.

SUMMARY OF THE INVENTION

According to a preferred embodiment of the present invention, a system for battery verification comprises utilizing a keyed algorithm that generates a "verification number" which is based on a battery's unique EPROM ID and is stored in conjunction with the battery's EPROM ID, thereby providing a means for the battery EPROM ID to be verified.

Advantageously, this keyed algorithm and generated-"verification number"will successfully defeat and discourage pirates and counterfeiters from copying EPROM IDs in an attempt to manufacture and distribute counterfeit batteries to operate with authorized electronic devices.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
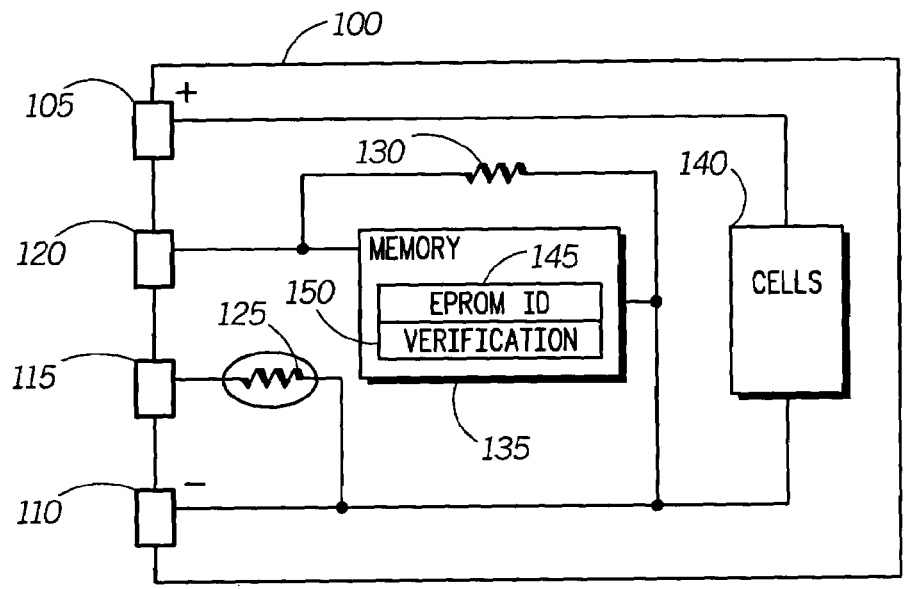
FIG. 1 is an electronic block diagram illustrating a battery for powering an electronic device, in accordance with a preferred embodiment of the present invention.

According to an exemplary embodiment of the present invention, FIG. 1 illustrates a battery (e.g., a battery pack) 100 for powering an electronic device. The battery 100 includes several contacts for coupling to the battery 100. For example, four contacts can be provided: a positive host contact 105 providing a positive voltage, a negative host contact 110 providing a ground voltage, a thermistor contact 115 for sensing temperature, and a coding contact 120 for use in identifying the battery 100 by a connected electronic device. Temperature sensing may be done with a thermistor 125 within the battery 100. The thermistor 125 is used for sensing the temperature of one or more cells 140. The one or more cells 140 discharge to provide power to the host electronic device (not shown) and can preferably be recharged by a charger (not shown). The battery 100 further can include a coding resistor 130 and/or a memory device 135. The optional code resistor 130 typically has impedance that corresponds to a particular cell.

The memory device 135 stores battery information, typically including serial number, type of cell, charging instructions, charge usage histogram, date of manufacture, first date of use, and similar information. The memory device 135, for example, can be an Electrically Programmable Read Only Memory (EPROM). In accordance with the present invention, the memory device 135 is programmed by the EPROM IC (integrated circuit) vendor with a unique EPROM ID number 145 at the IC factory. In accordance with the present invention, the EPROM ID number 145 is used to generate an associated "verification number" 150 based on a known KEY. The KEY can comprise any number, algorithm, mathematical formula, and/or method, for applying this KEY to generate a verification number for the battery 100. The verification number 150 typically is programmed into the battery's EPROM 135 by the manufacturer of the battery 100 and not the EPROM IC 135 manufacturer. The verification number 150 provides a secure identification to be used for authorization of the battery 100 by a connected electronic device or charger also having knowledge of the KEY. For example, an authorized battery manufacturer, the authorized electronic device manufacturer, and the authorized charger manufacturer, can have the shared KEY. The KEY can be stored in the electronic device and/or charger for later use and can also be stored in the authorized battery manufacturer's EPROM programming software. The EPROM programming software could technically be source code so the manufacturer themselves would not readily identify the KEY code.

Figure 2:
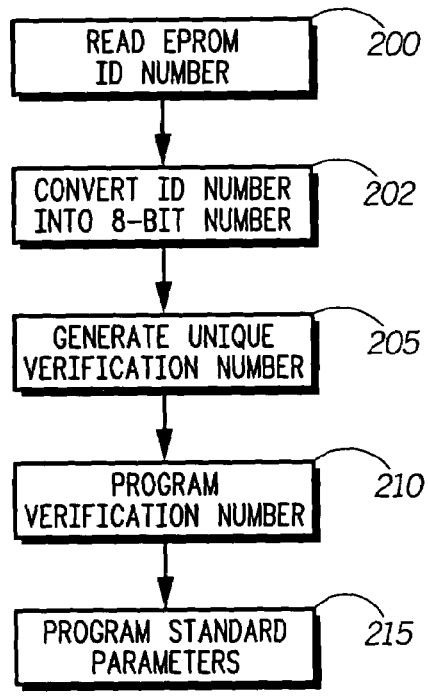
FIG. 2 is a flowchart illustrating one embodiment of the operation of programming the battery of FIG. 1.

FIG. 2 is a flowchart illustrating one exemplary embodiment of the generation of the verification number 150 such as can be accomplished at the battery manufacturer in accordance with the present invention. The process begins with Step 200 in which the programmer reads the EPROM ID number 145 from the memory device 135. For example, the programmer can read the EPROM ID number 145 from the EPROM's ROM space. Note that since this EPROM ID number 145 is in the ROM space it will be fixed at the IC manufacturer and cannot be changed after manufacture of the memory device 135 IC. The EPROM ID number 145 can be, for example, a serial number for the memory device 135. However, it should be clear to those of ordinary skill in the art in view of the present discussion that the ID number can be any number associated with the battery, and the number does not have to be stored in the memory device. Continuing with the present example, in Step 202, the ID number is manipulated into an 8 bit number. Next, in Step 205, the programmer mathematically applies the KEY to the 8 bit manipulated EPROM ID number in step 202 to generate the verification number 150. This can be accomplished through a series of logical and/or mathematical manipulations such as 'and'ing, 'or'ing , adding, subtracting, multiplying, and/or dividing the 8 bit number generated in step 202 with the locally stored KEY. Next, in Step 210, the programmer programs the verification number 150 into the memory device 135. Next, in Step 215, the programmer programs any other standard parameters such as the fuel bar and associated parameters into the memory device 135 as is well known in the art.

Figure 3:
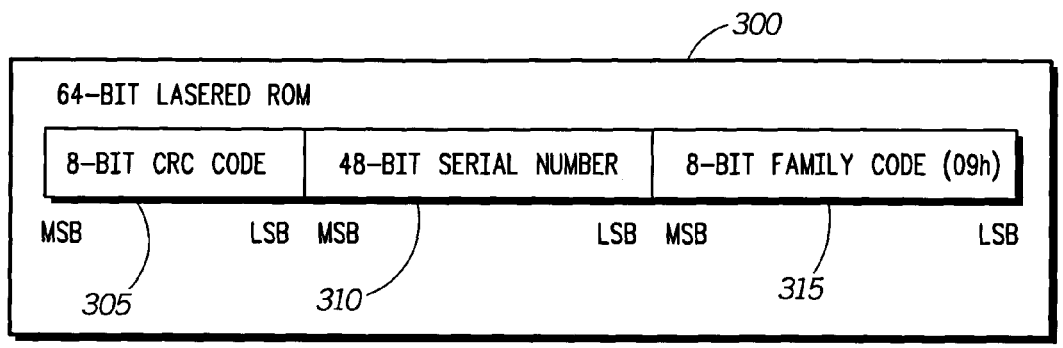
FIG. 3 illustrates an exemplary embodiment of a memory for use within the battery of FIG. 1.

FIG. 3 illustrates an exemplary embodiment of at least a portion of the programmed memory 300 in accordance with the present invention. As illustrated, an 8-bit family code 315 is stored in the programmed memory 300. The 8-bit family code 315, for example, can be a manufacturer specific ID number. An 8-Bit CRC code 305 is also stored in the programmed memory 300. Lastly, a 48 bit serial number 310 is stored in the programmed memory 300. This 48 bit serial number can be an identification number for the memory 300. Any or all of these can be utilized to calculate the verification number 150 as described above.

Figure 4:
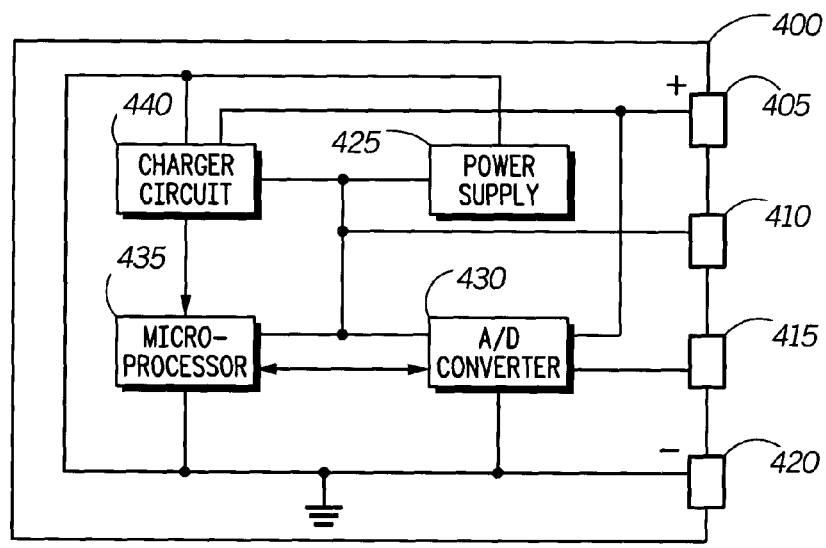
FIG. 4 is a block diagram illustrating a battery charger for use with the battery of FIG. 1.

FIG. 4 is a block diagram of a battery charger 400 suitable for charging the battery 100 of FIG. 1, in accordance with a preferred embodiment of the present invention. As illustrated, the charger 400 includes interfaces for coupling to the battery 100 when charging the battery 100. More particularly, the charger 400 includes a positive interface 405, a coding interface 410, a thermistor interface 415, and a negative interface 420 that are respectively coupled to the positive host contact 105, the coding contact 120, the thermistor contact 115, and the negative host contact 110 of the battery 100. The charger 400 further comprises a power supply 425 coupled to a charger circuit 440 which will provide a charging current to the battery 100 via the positive interface 405 connected to an output of the charger circuit 440. The charger 400 further includes an analog to digital converter 430 coupled between a microprocessor 435 and the various interfaces to implement battery charging and authentication in accordance with the present invention. A ground terminal of the charger 400 provides a ground reference to all its components.

Figure 5:
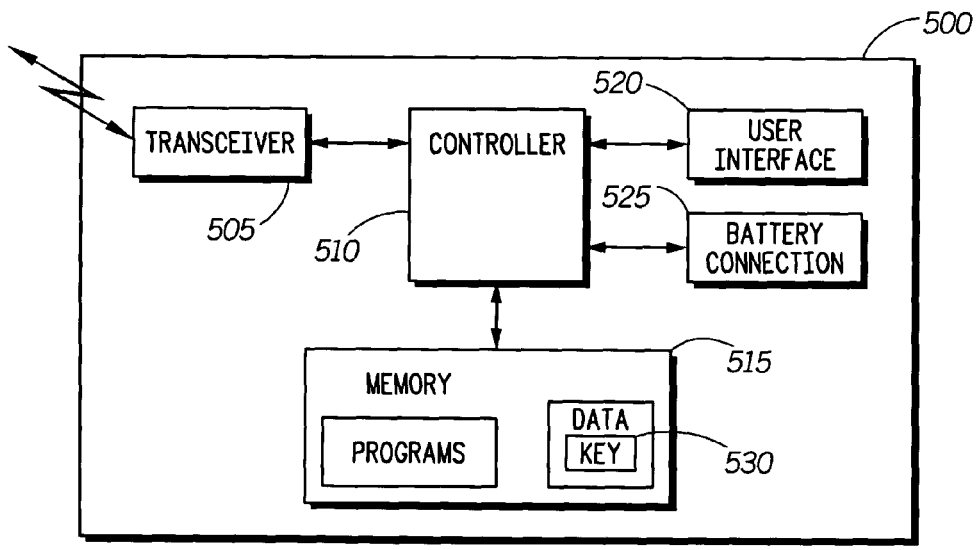
FIG. 5 is an electronic block diagram illustrating an electronic device for use with the battery of FIG. 1.

The charger 400 further includes the microprocessor 435 for identifying the battery 100 to which the charger 400 is coupled. According to the present invention, the battery 100 can be authenticated by the charger 400 using the microprocessor 435 coupled to the coding interface 410. The microprocessor 435 preferably includes memory and is programmed with the KEY as described previously herein. The microprocessor 435 can thus verify the EPROM ID of the battery 100 is a valid EPROM ID by not only comparing it to a known bad EPROM ID lookup table, but also by verifying the verification number 150 (which is based on the EPROM ID) matches the KEY. This can be accomplished through a series of logical and/or mathematical manipulations such as 'and'ing, 'or'ing, adding, subtracting, multiplying, and/or dividing the 8 bit number generated in step 202 with the locally stored KEY. FIG. 5 is a block diagram of an electronic device 500 that uses the battery 100 of FIG. 1, in accordance with a preferred embodiment of the present invention. As illustrated, the electronic device 500 includes a transceiver 505, a controller 510, a memory 515, a user interface 520, and a battery connection 525.

The transceiver 505 is utilized to communicate between the electronic device 500 and other various apparatus. For example, when the electronic device 500 is a wireless communication device, the transceiver receives and transmits various wireless communication signals within a communication system. The transceiver 505 preferably employs conventional modulation and demodulation techniques for receiving the communication signals transmitted by the communication system to the electronic device 500. The transceiver 505 further transmits signals in response to commands from the controller 510. It will be appreciated by those of ordinary skill in the art that the transceiver 505 can be a singular electronic circuit capable of both functions, or alternatively can be an individual receiver circuit and a transmitter circuit.

Coupled to the transceiver 505 is the controller 510. The controller 510 utilizes conventional signal processing techniques for processing the received signals. The controller 510 further sends commands to various operative components of the electronic device 500 as described herein. To perform the necessary functions of the exemplary electronic device 500, the controller 510 is coupled to a user interface 520. The user interface 520, for example can include a display, an alert circuit, and a user input mechanism.

The controller 510 is further coupled to the memory 515. The memory 515 preferably comprise a random access memory (RAM), a read-only memory (ROM), and/or an electrically erasable programmable read-only memory (EEPROM)(not shown), flash memory, or an equivalent. The controller 510 executes various program steps stored within the memory 515 and further utilizes the data stored within the memory 515. The programs in the memory 515 can be hard coded or programmed into the electronic device 500 during manufacturing, can be programmed over-the-air upon customer subscription, or can be downloadable applications. It will be appreciated by one of ordinary skill in the art that other programming methods can be utilized for programming the memory 515. Similarly, the data stored in the memory 515 can be hard coded or programmed into the electronic device 500 during manufacturing, can be programmed over the air upon customer subscription, or can be downloaded. It will be appreciated by one of ordinary skill in the art that other programming methods can be utilized for programming the data into the memory 515.

In accordance with the present invention, a KEY 530 is stored within the memory 515 for use by the controller 510 in the authentication of a battery connected using the battery connection 525 to the electronic device 500. The controller 510 is preferably programmed to verify the EPROM ID is a valid EPROM ID by not only comparing it to a known bad EPROM ID lookup table, but also by verifying the verification number which is based on the EPROM ID matches the KEY 530.

Figure 6:
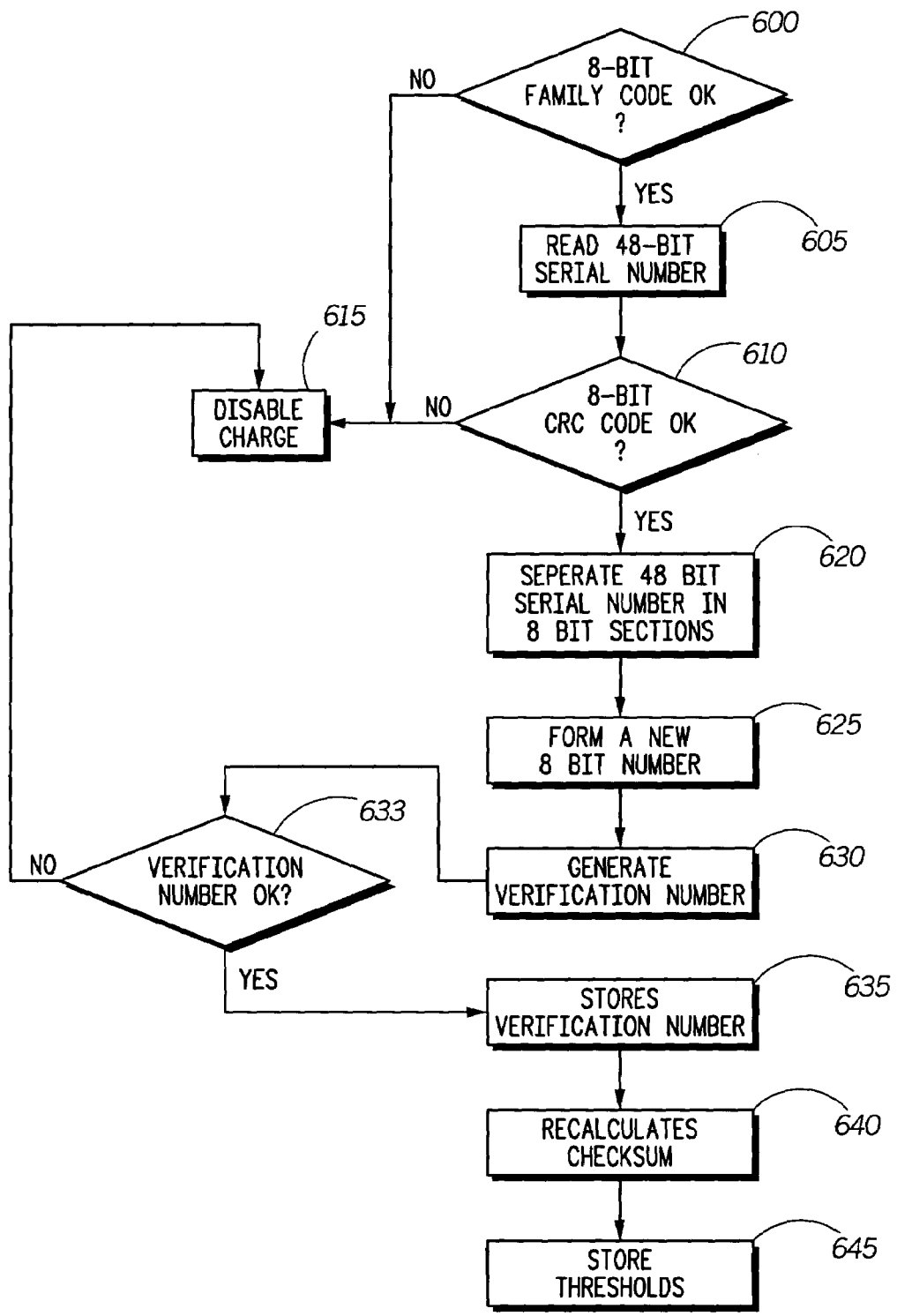
FIG. 6 is an operational flow diagram illustrating an operational sequence of battery authentication of the battery of FIG. 1.

FIG. 6 illustrates an exemplary operational sequence for generating the verification number 150 using the exemplary programmed memory 300 of FIG. 3 by a processor of an attached device such as the charger 400 or the electronic device 500. The processor, for example, can be the microprocessor 435 of the charger 400 or the controller 510 of the electronic device 500. As illustrated, in Step 600, the processor verifies the 8-bit family code 315 for a specific ID number. Next, in Step 605, the processor reads the 48-Bit Serial Number 310. Next, in Step 610, the processor verifies the 8-Bit CRC code 305. In Step 615, when the CRC is unauthorized in Step 610 or the family code 315 is unauthorized in Step 600, the charge is disabled. In Step 620, when the CRC is authorized in Step 610, the processor takes the 48 bit serial number 310 and separates it into 6 distinct 8 Bit sections. Next, in Step 625, the processor manipulates those 6 bytes together by 'and'ing, 'or'ing, adding, subtracting, multiplying, and/or dividing them to form a new 8 Bit number. Next, in Step 630, the processor uses this new 8 Bit number and applies the known Key to it to generate a verification number. This can be accomplished through a series of logical and/or mathematical manipulations such as 'and'ing, 'or'ing, adding, subtracting, multiplying, and/or dividing the 8 bit number generated in step 625 with the locally stored KEY. Then, in Step 633, the processor checks if the generated verification number matches a predefined number for the battery. If there is no match then the battey is determined unauthorized and, for example, the charging or use of the battery is disabled by the electronic device. On the other hand, in Step 633, if there is a match, then, in Step 635, the processor stores the verification number. Next, in Step 640, the processor recalculates the Checksum based on the new verification number and fuel bar and charge threshold information to be programmed. Next, in Step 645, all charge and device thresholds are stored. Each unique checksum and the verification number are used to verify that the data is valid and not corrupted thereby assuring safe charging and use of the battery and overall system functionality.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form. Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A system for verification of a battery, comprising:
   a battery, wherein the battery comprises:
      a memory for storing an identification number and a verification number, wherein the verification number is generated by applying a key to the identification number; and
   an electronic device coupled to the battery, wherein the electronic device comprises:
      a device memory for storing the key; and
      a processor for verifying the verification number of the battery by applying the key to the identification number.

2. A system as recited for claim 1, wherein the electronic device comprises at least one of a battery charger, a wireless communication device, a Personal Digital Assistant, a handheld computer, a media drive, a digital camera, a portable audio player, a portable video player, and an electronic game.

3. A method for verification of a battery, the method comprising:
   communicating with a battery, wherein one or more codes and a serial number are stored within the battery;
   verifying the one or more codes for authorization;
   reading the serial number;
   performing a mathematical function on the serial number to provide a new number when the one or more codes are authorized in the verifying step;
   applying a key to the new number to generate a verification number; and
   storing the verification number.

4. A method as recited for claim 3, wherein the one or more codes includes an 8-bit family code, and further wherein the verification step includes comparing the 8-bit family code to a pre-defined identification number.

5. A method as recited for claim 3, wherein the serial number is a 48-bit serial number.

6. A method as recited for claim 3, wherein the one or more codes includes an 8-bit CRC code.

7. A method as recited for claim 3, further comprising disabling use of the battery when one of the one or more codes is unauthorized in the verification step.

8. A method as recited for claim 3, further comprising disabling charging of the battery when one of the one or more codes is unauthorized in the verification step.

9. A method as recited for claim 3, wherein the performing a mathematical function comprises:
   separating the serial number into six distinct 8-Bit sections; and adding the six distinct 8 Bit sections together to form a new 8-Bit number.

10. A method as recited for claim 3, further comprising:
    calculating a checksum using the new verification number; and
    verifying data stored in the battery is valid using the checksum.

11. A method as recited for claim 3, further comprising:
    programming the battery with a battery verification number prior to the communicating step;
    comparing the battery verification number with the verification number; and
    authorizing usage of the battery when the battery verification number matches the verification number.

12. A method as recited for claim 11, wherein the programming comprises:
    reading an EPROM identification number from a memory device within the battery;
    generating the battery verification number by mathematically applying the key to the EPROM identification number; and
    programming the battery verification number into a memory device of the battery.

13. A method as recited for claim 3, further comprising:
    programming the battery with a battery verification number prior to the communicating step;
    comparing the battery verification number with the verification number; and authorizing charging of the battery when the battery verification number matches the verification number.

14. A method as recited for claim 13, wherein the programming comprises:
    reading an EPROM identification number from a memory device within the battery;
    generating the battery verification number by mathematically applying the key to the EPROM identification number; and
    programming the battery verification number into a memory device of the battery.

15. A battery comprising:
    at least one battery cell for providing power for an electronic device; and
    memory for storing a memory identification number and for storing a battery verification number, the stored battery verification number being generated by mathematically applying at least a key to the memory identification number.

16. The battery of claim 15, wherein the memory further stores at least one additional code.

17. The battery of claim 16, wherein the at least one additional code comprises a CRC code.

18. The battery of claim 15, wherein the memory identification number is a serial number for identifying the memory.

* * * * *